United States Patent [19]

Banos

[11] Patent Number: 4,779,429

[45] Date of Patent: Oct. 25, 1988

[54] METHOD OF FABRICATING COMPOSITE ELEMENTS KNITTED IN THREE DIMENSIONS

[75] Inventor: Jean Banos, Merignac, France

[73] Assignee: Aerospatiale Societe Nationale Industrielle, France

[21] Appl. No.: 36,115

[22] Filed: Apr. 9, 1987

Related U.S. Application Data

[63] Continuation-in-part of Ser. No. 732,430, May 9, 1985, abandoned.

[30] Foreign Application Priority Data

May 15, 1984 [FR] France .................................. 84 07489

[51] Int. Cl.$^4$ ........................ D04B 11/04; D04B 35/36
[52] U.S. Cl. .......................................... 66/83; 66/88; 66/190
[58] Field of Search .................. 66/10, 1 R, 83, 88, 66/147, 190; 28/140, 149; 139/11, 22, 383 B

[56] References Cited

U.S. PATENT DOCUMENTS

| | | | |
|---|---|---|---|
| 3,904,464 | 9/1975 | King ................................ | 139/408 X |
| 4,183,232 | 1/1980 | Banos et al. ...................... | 139/22 X |
| 4,346,741 | 8/1982 | Banos et al. ...................... | 139/387 X |
| 4,393,669 | 7/1983 | Cahuzac ............................ | 139/11 X |
| 4,526,026 | 7/1985 | Krauland, Jr. .................... | 66/1 R |
| 4,613,931 | 12/1986 | Banos ................................ | 66/83 |
| 4,615,256 | 10/1986 | Fukuta et al. .................... | 139/11 X |

Primary Examiner—Wm. Carter Reynolds
Attorney, Agent, or Firm—McGlew and Tuttle

[57] ABSTRACT

This section element has a cross-sectional shape with reentrant or inside angles and/or concave parts or a hollow polygonal or other shape. A plurality of parallel threads are held taut and maintained in the longitudinal direction of the section element in a configuration which corresponds to the cross-sectional shape of the desired section element. These longitudinal threads are progressively displaced continuously in front of a group of knitting heads knitting in two dimensions which are orthogonal and perpendicular to said longitudinal threads. Each knitting head comprises a plurality of series of needles I, L1,L2, LA, A1 and A1' each of which covers a specific portion of the cross section of the section element.

7 Claims, 1 Drawing Sheet

METHOD OF FABRICATING COMPOSITE ELEMENTS KNITTED IN THREE DIMENSIONS

CROSS REFERENCE TO RELATED APPLICATION AND PATENT

The present application is a continuation-in-part application of the inventor's application by the same title having Ser. No. 732,430 and filed May 9, 1985 now abandoned. Copending with that application was an application by the same inventor having Ser. No. 732,433, filed on the same date of May 9, 1985 and now U.S. Pat. No. 4,631,931 to Banos, which patent is incorporated here by reference.

FIELD AND BACKGROUND OF THE INVENTION

The present invention relates to a section or structured element of composite material, of the type knitted in three dimensions from natural or synthetic threads or fibers, impregnated with a resin.

More particularly, the invention concerns a process of producing a structured element that is knitted in three dimension and which has, in cross-section, a geometric form or cross-section composed of several rectangular surfaces connected together, at least two of these adjacent rectangular surfaces delimiting a reentrant angle of the geometric form.

Many section elements of this type are already known and the methods of knitting them in three dimensions are now currently employed.

However, many section elements produced up to the present time, such as those, for example, disclosed in the French Pat. No. 73/14956 and U.S. Pat. Nos. 4,183,232 and 4,346,741 of the applicant, are section elements having a cross-section in the shape of a solid of revolution whose length is limited by the very nature of their method of fabrication. U.S. Pat. No. 4,183,232 discloses a method which uses a plate on which are fixed rods or bars which define the periphery of the solid of periphery of the solid of revolution, this plate being driven in rotation so as to cause the bars to pass in front of knitting heads. The needles of these knitting head face threads in two transverse directions, the threads disposed in the third dimension being thereafter placed in the direction of the rods, by casting them individually in accordance with the method described in U.S. Pat. No. 4,393,669 of the applicant.

Apart from the aforementioned patents, there is also known a European Pat. No. 0,056,351 which describes a method comprising producing an element that is knitted in three dimensions having a certain thickness and whose marginal parts are divided into two in the direction of the thickness.

In order to produce a section element, it is then necessary to fold the marginal parts outwardly to obtain the desired shape, before impregnation. This method limits the shapes which may be obtained for the section of the section elements.

Various processes and machines are already known which permit realizing structured elements that are three diomensions and which have, in cross-section, a rectangular general form.

U.S. Pat. No. 4,526,026 (Krauland) describes an apparatus comprising two groups of thread guiding organs disposed at right angles to each other which permit the introduction of threads in a plane following two directions, X and Y, around threads extending at right angles following a third direction Z, and two rows of needles forming between them a right angle and disposed parallel and perpendicularly to the XY plane.

This apparatus permits making elements of rectangular cross-section, but if one wishes to modify the cross-sectional form, its configuration must be modified beforehand.

U.S. Pat. Nos. 3,904,464 and 4,038,440 (King) both describe an apparatus comprising two rows of parallel needles extending perpendicularly in an XY plane which is itself perpendicular to an assembly of parallel rods around which the rows of needles interlace threads.

With this apparatus, the cross-sectional form of the element obtained is rectangular and cannot be modified.

SUMMARY OF THE INVENTION

U.S. Pat. No. 4,631,931 (Banos) identified above, describes a machine for continuously manufacturing an element that is knitted in three dimensions, comprising a perforated plate with holes in which hollow rods are held following a configuration which corresponds to the desired cross-sectional form of the element to be manufactured. Parallel threads are strung in the rods, defining between them lanes crossing perpendicularly to the rods and threads.

This machine further contains two knitting heads, each formed of a row of parallel needles, the needles of one head being perpendicular to those of the other head, thus defining a plane perpendicular to the threads that are strung in the hollow rods and held in the plate.

The needles of the two knitting heads can thus knit threads between those strung in and around the rods.

It is the object of the present invention to provide a process of producing elements knitted in three dimensions, and having in cross-section, a geometric form composed of adjacent rectangles, at least two of which delimit a reentrant or inside angle, by means of the machine described in the aforementioned U.S. Pat. No. 4,631,931, the specification of which is incorporated herein by reference.

According to the process of the invention, the geometric form of the cross section of the desired element is divided into finite rectangular areas or portions, each corresponding to a series of needles in each knitting head to bring into position, in these portions, successive sheets of threads along two directions perpendicular to the threads strung in the hollow rods.

According to another characteristic of the invention, in this assembly of knitting heads, several trains of needles are selected, each corresponding to a finite portion of the sectional form of the structure or element to the knit.

According to still another characteristic of the invention, each of the finite portions of the sectional form of the structure is formed by the longitudinal threads disposed in rows to form a certain number of crossing lanes.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

The following description and accompanying drawings, which are given by way of non-limiting examples, will explain how the present invention can be carried out. In the drawings.

DESCRIPTION OF THE PREFERRED EMBODIMENTS

With reference to the drawings, it can be seen that each of the figures shows, in section, a shape having a plurality of inside or reentrant angles.

Figure 1:
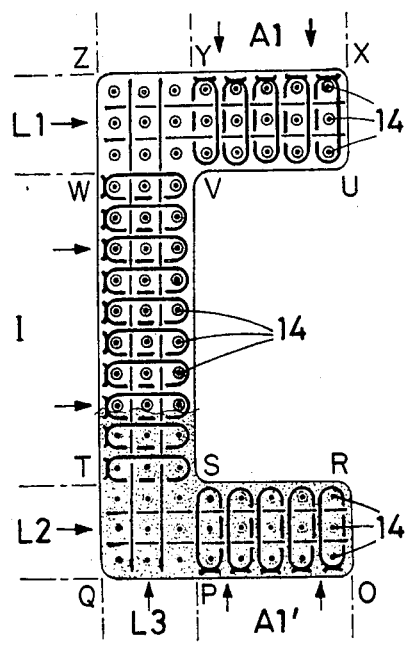
FIGS. 1 to 4 are sectional views of embodiments of composite section elements knitted in three dimensions in accordance with the invention and showing the cutting out of these portions into finished portions.

The section element shown in FIG. 1 is formed by first of all holding taut a plurality of threads 14 in parallel relation in accordance with the illustrated C configuration so as to constitute the longitudinal threads of the section element.

The section element shown in FIG. 1 has a C-shaped form including an intermediate rectangular area or portion WVTS. At the ends of portion WVTS there is attached, in a perpendicular position, two lateral rectangular wings ZXWU and TRQO which extend in the same direction with an equal length.

This group of threads 14 is displaced slowly in front of a group of knitting heads of known type (such knitting heads are described for example in the forementioned patents of the applicant can be used) which have not been shown in the drawing, including, in the embodiment shown in FIG. 1, a total of six trains of needles.

(a) A first train of needles I is provided for the intermediate protion WVTS, having a length corresponding to the width of a fourth train of needles L3;

(b) A second train of needles D1 and a third train of needles L2 are provided for the portions ZXWU and TRQO having a length corresponding to the width of the fourth train of needles L3 and a fifth train of needles +A1 (or A1'), these three first trains of needles being parallel;

(c) A fourth train of needles L3 acts on intermediate part WVTS and a portion of each of the lateral rectangular wings ZXWU and TRQO. In other words, the fourth train of needles L3 acts on portion ZYQP. Fourth needle train L3 has a length equal to the combined widths of the first, second and third needle trains (I+L1+L2), and (d) fifth and sixth trains of needles A1, A1' which are equal in width and in opposite direction, as shown. Trains A1 and A1' act on parts YVXU and SRPO respectively. The length of these needle trains is equal the width of needle train L1 or L2.

It will be observed that the needles of the three first trains I, L1 and L2 are perpendicular to the needles of the second group of three trains L3, A1 and A1', these last two extending in opposite directions relative to each other.

Needle trains I, L1 and L2 are applied in a direction from the left to the right as shown in FIG. 1. Needle train A1 is applied in a downward direction as seen in FIG. 1 while needle trains A1' and L3 are both applied in an upward direction as shown in FIG. 1.

The trains of needles of the knitting heads place in the known manner the threads on each side of the longitudinal threads 14 in the crossing passageways formed by the rows of longitudinal threads, and the threads 14 are made to advance in front of the group of knitting heads as the latter deposits threads forming transverse layers.

It will be understood that it is in this way possible to knit continuously in three dimensions section elements having many sectional shapes.

A gray part (stipled) in FIG. 1 shows the threads embedded in the resin.

Figure 2:
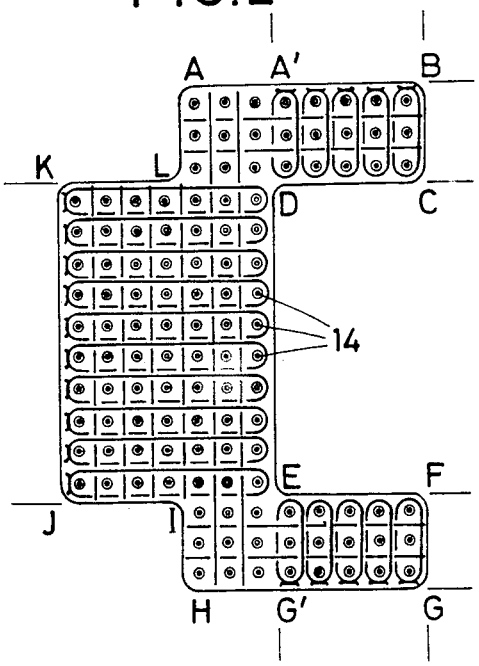

A second embodiment is shown in FIG. 2 which represents a section element of the same type as that shown in FIG. 1 but in which the intermediate part is wider and projects in the direction opposed to the direction in which the wings project.

The second element A,B,C,D,E,F,G.H,I.J,K,L can be considered to comprise seven portions, namely:

(a) a first portion A,B,C,L
(b) a second identical portion F,G,H.I
(c) a third portion K,D,E,J
(d) a fourth portion I,J,K,L
(e) a fifth portion A,A',(D,E) G', H, (I,L)
(f) a sixth portion A;,B,C,D and
(g) a seventh portion E,F,G, G' identical to the preceding portion.

It will be understood that, in this embodiment, the group of knitting heads must comprise three trains of needles which are parallel, two of which are identical and in the opposite direction to the third for the two first portions having a length AB (=IF) and the third for the third portion having a length KD, and four other trains of needles perpendicular to the three first trains, namely: the fourth for the portion I,J,K,L having a length JK, the fifth for the portion A,A', (D,E), G'H (I,L), having a length AH and the sixth and seventh for the portions A', B,C,D and E,F,G,G' which are identical and in the opposite direction and having a length BC (=FG).

The inside angles of the shape in FIG. 2 are at D,E, I and L.

Figure 3:
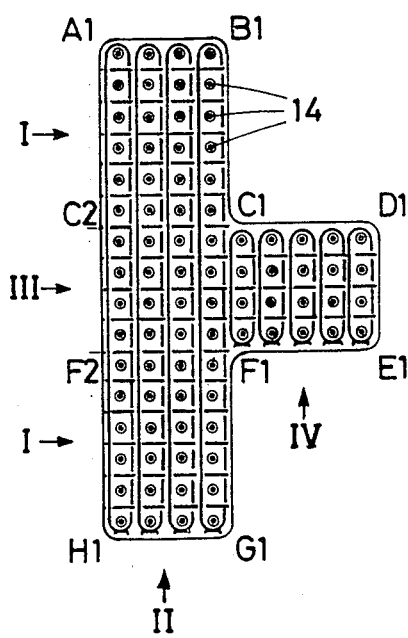
Figure 4:
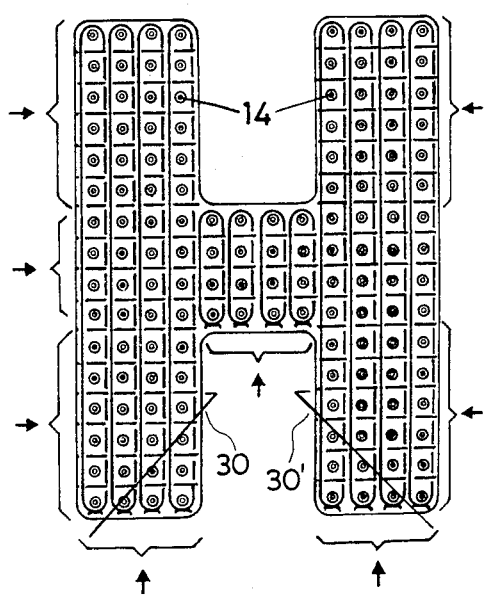

The method according to the invention will be applicable according to the same theory for the embodiment shown in FIGS. 3 and 4 so that each portion of the area of the section of the section element is covered by two trains of neddles crossing at a right angle on each side of the longitudinal threads 10 and passing in the rows and the passageways at right angles defined by these threads.

In the embodiment shown in FIG. 3, the reclining T-section element will be formed from five portions, i.e. according to the same reasoning:

(a) two identical portions A1, B1, C1, C2 and F1, G1, H1, F2
(b) a portion A1, B1, (C1,F1) G1, H1 (F2, C2)
(c) a portion C2, (C1), D1,E1, (F1) F2
(d) a portion C1, D1,E1,F1 and the trains of needles of the group of heads acting as shown by the arrows I,II,III,IV in accordance with the above order. Angles at C1 and F1 are inside angles.

In the embodiment shown in FIG. 4 which represents an H-section element, the various trains of needles and their direction of action are indicated by the arrows and the braces, namely a total of eight portions.

It will be understood that degressive thicknesses of the lower wings as indicated at lines 30 and 30' of the section element shown in FIG. 4, could be obtained by acting individually on the length and/or the travel of the needles in the trains corresponding to the portions of the section including said degressive thicknesses. It will lastly be understood that the section elements knitted by such a method may be constructed with dry or pre-impregnated threads or fibers and that these section elements may be then hardened by any known means, after impregnation, in the case of section elements obtained from dry threads.

The shapes in each of FIGS. 1 through 4 are made up of a plurality of interconnected rectangular areas which are thus knit with a plurality of needle trains, one train being for each rectangular area.

To form the cross-sectional configuration shown in FIGS. 1 through 4, using the teaching of U.S. Pat. No. 4,631,931, the skilled artisan selects a corresponding configuration for the perforated plate, or at least for the pattern of perforation on the perforated plate, which pattern is then filled in by the rigid hollow rods and taut threads. Each train of needles is then provided by a separate one of the needle heads which are used in the U.S. Pat. No. 4,631,931.

While specific embodiments of the invention have been shown and described in detail to illustrate the application of the principles of the invention, it will be understood that the invention may be embodied otherwise without departing from such principles.

What is claimed is:

1. A method for fabricating a section element which is knitted in three dimensions from fibers impregnated with a resin, the section element having a cross-section geometrical shape composed of a plurality of interconnected rectangular areas, at least two adjacent rectangular areas defining an inside angle of said geometrical shape, the method comprising:
   holding a first plurality of threads taut and maintaining said first plurality of threads parallel to a longitudinal direction of said element, said longitudinal direction extending perpendicularly to said geometrical shape, said first plurality of threads lying in rows and columns filling said geometrical shape and defining crossing passageways over said geometrical shape and over each of said rectangular areas of said geometrical shape;
   feeding additional pluralities of threads into said crossing passageways in two orthogonal directions parallel to said geometrical shape, each of said additional pluralities of threads being fed by a separate needle train, each rectangular area of said geometrical shape having at least one needle train for knitting fibers into said rectangular area; and
   continuously moving said first plurality of threads in said longitudinal direction as said additional pluralities of threads are fed through said crossing passageways to fabricate said section element.

2. A method according to claim 1, wherein said geometrical shape has an intermediate rectangular area with opposite ends, and additional rectangular areas connected to each end of said intermediate rectangular area, to form a C-shped geometrical shape.

3. A method according to claim 1, wherein said geometrical shape is T-shaped, and using five separate needle trains to fabricate the section element.

4. A method according to claim 1, wherein said geometrical shape is H-shaped, and including eight separate needle trains for fabricating the section element.

5. A method for fabricating a section element which is knitted in three dimensions from fibers impregnated with a resin, the section element having a cross-section geometrical shape composed of a plurality of interconnected rectangular areas, at least two adjacent rectangular areas defining an inside angle of said geometrical shape, the method comprising the steps of:
   holding a first plurality of threads taut and maintaining said first plurality of threads parallel to a longitudinal direction of said element, said longitudinal direction extending perpendicularly to said geometrical shape, said first plurality of threads lying in rows and column filling said geometrical shape and defining crossing passageways over said geometrical shape and over each of sadi rectangular areas of said geometrical shape, each of said rectangular areas having a length and a width in a direction perpendicular to said longitudinal direction;
   feeding additional pluralities of threads into said crossing passageways in two orthogonal directions parallel to said geometrical shape including employing at least a first needle train in a width direction, said first needle train having a length equal to the width of a first rectangular area of said two adjacent rectangular area, employing at least a second needle train in a width direction, said second needle train having a length equal to the width of said second rectangular area, employing a third needle train in a length direction, said third needle train having a length equal to a length of the first rectangular area and employing at least a fourth needle train in a length direction, said fourth needle train having a length equal to the length of said second rectangular area; and,
   continuously moving said first plurality of threads in said longitudinal direction as said additional plurality of threads are fed through said crossing passageways to fabricate said section element.

6. A method for fabricating a section element according to claim 5, wherein: one of said needle trains being applied in a width direction is applied in a direction opposite to another of said needle trains being applied in a width direction.

7. A method for fabricating a section element according to claim 5, wherein: one of said needle trains being applied in a length direction is applied in a direction opposite to another of said needle trains being applied in a length direction.

* * * * *